March 13, 1928. 1,662,304
L. J. DOOGOOD ET AL
MULTIPICTURE CAMERA
Filed April 13, 1927
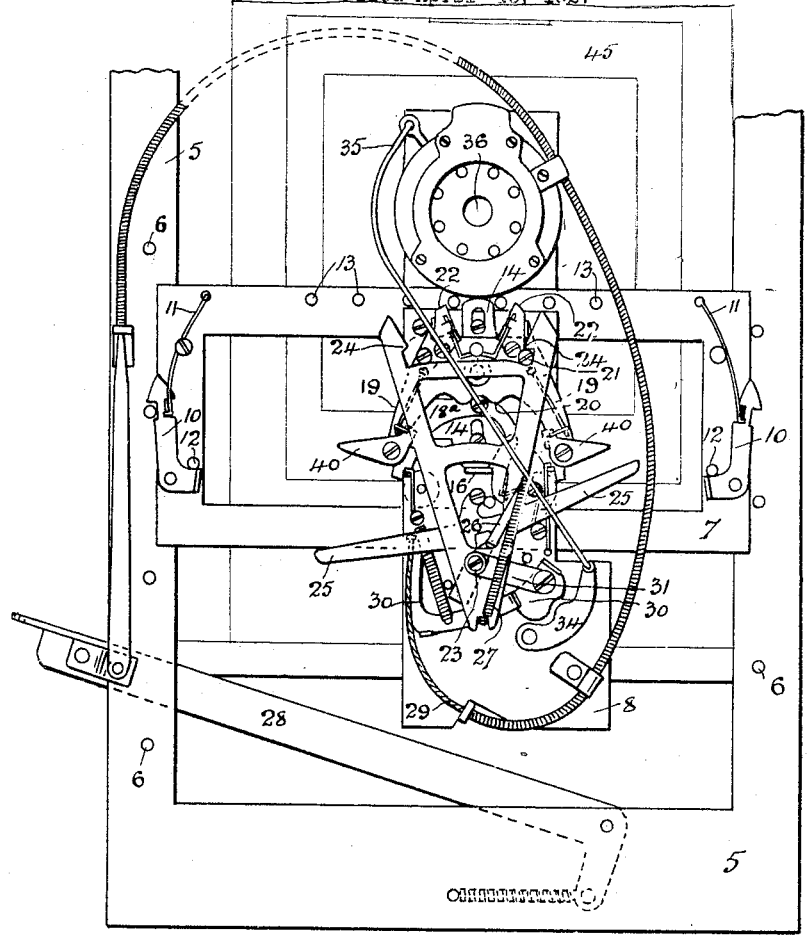
Fig. 1
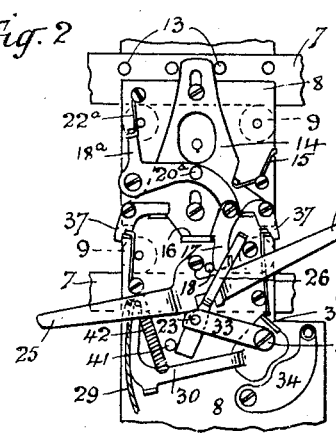
Fig. 2
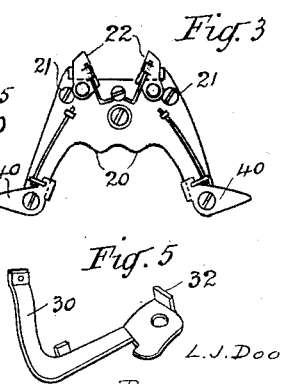
Fig. 3
Fig. 5
Fig. 4
Inventors:
L. J. Doogood &
L. P. Branagan
By Langner Parry Card & Langner
Attys Patented Mar. 13, 1928.

1,662,304

UNITED STATES PATENT OFFICE.

LEONARD JOSEPH DOOGOOD AND LEO PATRICK BRANAGAN, OF MELBOURNE, VICTORIA, AUSTRALIA.

MULTIPICTURE CAMERA.

Application filed April 13, 1927, Serial No. 183,531, and in Australia February 13, 1927.

This invention relates to cameras in which a number of pictures can be taken without opening the camera, and has for its object to provide mechanism whereby a number of picture impressions may be taken on a single plate or film placed immediately opposite the lens by moving the lens over the plate or the plate over the lens after each opening of the shutter of the lens.

In such a camera means must be provided for adjusting the relative positions of the plate and lens after each picture has been taken and this is done in this invention so that when say from ten to fifty impressions are taken on a single fixed plate, it may be removed from the camera and the pictures developed therefrom if necessary for individual enlargement.

In carrying the invention into practise we have elected to move the lens over the fixed plate, which may be of the ordinary commercial sizes, to receive pictures thereon successively until its surface is fully occupied.

In the accompanying drawings,

Fig. 1 shows the lens actuating mechanisms in front elevation.

Fig. 2 is a like view of the locking plate and reversing means with the M and V plates removed.

Fig. 3 is a plan view of the M plate.

Fig. 4 is a transverse sectional elevation of the light excluding plates, and

Fig. 5 shows in perspective view the main actuating cam lever and timer.

In a suitable box a stout framework 5 is mounted. At each side the frame is a vertical row of studs 6 each stud in a row being staggered with that in the other row. Between the vertical members of the framework a rectangular frame 7 is suspended, and adapted to move horizontally on the frame 7 is a base-plate 8 on which are anti-friction wheels 9 that engage and run upon the frame 7.

At each side of the frame is a latch 10 that is kept in an outward position by a spring 11 and one of which is always in engagement with a stud 6. The outward movement of the latches are limited by the studs 12 and from one or other of the latches the frame 7 is suspended.

On the top horizontal member of the frame 7 is a row of studs 13 between which the rounded upper end of a locking plate 14 can come. This plate is slotted and adapted to slide on the baseplate 8 and is kept in its normal position by a spring such as 15 (Fig. 2). The lower end of the locking plate is turned up in a toe 16 against which a shoulder on a camfinger 17 engages the cam on the finger bearing on a pin 18. The camfinger hangs from a lever 18ª pivoted on the baseplate 8 that is rocked in a manner to be explained.

Pivotally mounted over the locking plate in an M shaped plate 19 that is fashioned with a double cam 20 that bears on a pin 20ª on the lever 18ª. On the M plate are studs 21 and spring held pawls 22 at the top. A spring 22ª keeps the lever 18ª in its normal position.

Also pivotally mounted over but not to the baseplate at a point 23 is a V plate which has near its upper ends inwardly turned pawls 24 that are adapted to engage one at a time the studs 21 on the M plate. Below the V plate a double ended tappet lever 25 is pivotally mounted on a short radius on the baseplate. It is centrally notched to accommodate a goose necked rocking lever 26 to which a tension spring 27 is attached, its other end being connected to the lower end of the V plate. This lever 26 pivots on the baseplate below the spindle 23 and extends below the spindle where the throw of its lower end is limited by the stop 41. When the tappet is rocked it will carry the goose necked lever from a position over one leg of the V plate into position over the other leg of the plate and as it moves it will swing the spring 27 with it to one side or the other of the pivotal point 23. Thus according to the position of the tappet lever and the V plate will the pawls 24 be in actual connection with the studs 21 on the M plate.

A hand lever 28 is pivotally connected to the main frame 5 and is attached to a wire 29 that is secured to a main actuative cam lever 30 fulcrumed at 31 and controlled by a tension spring 42. Near its pivot its edge is turned up at 32 to contact with but not to lie in line with the edge of a lever or link 33 that is connected to the V plate pivot 23 and pivot 31. Near the lever 30 is a lever 34 against which the cam bears and to the end of lever 34 a rod 35 is connected that extends upwards to the shutter of the lens 36. When the hand lever is pressed down the cam lever 30 will be rocked and in so doing will push out the lever 34 to cause the shutter of the lens to open and close. At the same time the V plate movement timing member 32 on the cam lever will approach into line parallel with the side of the lever 33 and as the lever 30 continues its downward movement the piece 32 will carry the member 33 downwards and will draw down the V plate. When this occurs one of the pawls 24 will engage a stud on the M plate to cause same to rock and to bring one of its pawls 22 into contact with a stud 13 on the frame 7 to move the baseplate on which is the mechanism and the lens a certain distance across the photographic plate held fixed in the camera, but this movement will occur only after the shutter has been operated. As the M plate rocks, one member of the double cam 20 on the M plate will press down pin 20ᵃ on lever 18ᵃ and allow the cam finger 17 to pull down the locking plate 14 out of engagement with a pair of studs 13. When the rounded member of the locking plate has been drawn down sufficiently to clear the studs and the pawl 22 has operated to move the whole sideways the camfinger will have moved far enough to engage the stud 18 to throw it out of engagement with the locking plate which will return to its normal position between the next pair of studs 13 to lock and hold the mechanisms in that position.

Thus, each lateral movement will move the lens over a fresh area on the fixed sensitized plate.

On each side of the locking plate is a latch pawl 37 which, when the baseplate has been moved right across the frame comes into contact with the inner end of a latch 10 as the locking plate is lowered for the last time. This movement disengages the latch on that side and allows the baseplate to drop until arrested by the other latch catching on the next lower stud 6. At the same time the tappet lever 25 will be rocked by contact with the stud 6 below to reverse the action of the V plate and on the hand lever 28 being further operated the lens will be carried step by step in the reverse direction on the lower horizontal plane across the plate.

When the last position has been occupied it will be necessary to return the baseplate and frame 7 to the top or starting position in the framework 5 (the sensitized plate being now full) and this may be effected after removing the photographic plate, reversing the tappet lever 25 by hand, working the baseplate inwards a short distance and lifting it to the top. Then the tappet should be reversed manually and the whole worked backwards to the initial position when, by again reversing the tappet and inserting another sensitized plate, the camera will be ready to take another series of pictures on a single plate.

At the lower ends of the M plate 19 are pawls 40, one of which engages a stud 6 at one side when the baseplate or carriage has traversed the frame 7 to assist in lowering the same to the next stud below.

Behind the lens and between it and the photographic plate 44 is a system of light excluding scale like plates 45 in one of which is the projector barrel 43. As the lens moves the central plate and barrel will move with it at the same time sliding upon the next plate. To prevent the plates turning too far the edges are turned up and as the camera is operated the plates, which are in close frictional contact with each other, will each adapt itself to such movement.

The mechanism herein described is designed to move the lens often enough to permit of forty-eight pictures being placed on the plate.

Having now described our invention what we claim as new and desire to secure by Letters Patent is:—

1. In a camera, a framework, rows of studs at each side the framework, a frame and a baseplate adapted to be moved across the frame carrying a lens and hung in said framework and latches on the frame that engage the studs and are released therefrom on a last movement of the baseplate across the frame.

2. In a camera, a studded framework, a frame and a baseplate carrying a lens and latches hung therein, a row of horizontal studs on the frame, a locking plate on the baseplate and latch operating pawls on the locking plate, an M shaped plate pivotally mounted over the locking plate and means for rocking the M plate, for sliding the locking plate downwards and for moving the baseplate and lens laterally through the M plate.

3. In a camera, a studded framework, a frame and baseplate carrying a lens, and a locking plate hung therein, an M plate adapted to rock over the locking plate, studs on the M plate, a V plate pivotally mounted over the M plate, an inwardly turned pawl at each upper end of the V plate that engages one or other of the said studs, means for moving the V plate downwards to rock the M plate and pawls on the shoulders of the M plate that engage the studs on the frame.

4. In a camera having a baseplate carrying a lens and which is adapted to lateral movements in a frame in the camera, a locking plate, studs in the frame between which the said plate engages, a bell crank lever on the baseplate, and a turned out toe on the end of locking plate, a cam finger suspended from the bell crank, a shoulder on the finger adapted to engage the toe, a stop on the base plate against which the cam finger impinges when the bell crank is rocked and the locking plate is drawn downwards prior to the lateral movement of the baseplate in the frame.

5. In a camera having a baseplate carrying a lens and adapted to lateral movements in a frame in the camera, a locking plate, studs on the frame between which said plate engages, an M plate pivotally mounted over the locking plate, a double cam on the M plate, a bell crank lever on the base, a pin on the lever resting against the cam, an out turned toe piece on the locking plate, a cam finger suspended from the bell crank, a shoulder on the finger adapted to engage the toe to draw down the plate when the bell crank is rocked through the M plate and a stop against which the cam finger impinges to free the locking plate after the lateral movement of the baseplate is completed to permit it to return and engage another pair of studs in the frame.

6. A camera having a baseplate carrying a lens and adapted to lateral movements in a frame in the camera, a manual lever, a lever on the lower end of the baseplate and having a camlike edge near its pivot and to which the manual lever is flexibly connected, a lever also on the baseplate near the cam, a rod on the end of the second lever that is connected to the shutter of the lens, a V plate pivoted over the baseplate, a linked lever on the cam lever spindle and the V plate pivot spindle and a turned up lug on the cam lever near to but out of line with the linked lever all of which are operated by means of the manual lever, as and for the purposes specified.

7. In a camera, a studded framework, a frame and a baseplate carrying a lens and latches hung therein, a row of horizontal studs on the frame, a locking plate on the baseplate and latch operating pawls on the locking plate, an M shaped plate pivotally mounted over the locking plate and means for rocking the M plate, for sliding the locking plate downwards and for moving the baseplate and lens laterally through the M plate, a V plate pivotally mounted over the M plate, a goose neck rocking lever on the baseplate, a tension spring between the upper end of the said lever and the lower end of the V plate, a double tappet lever pivotally mounted on a short radius on the baseplate and adapted when rocked to move the goose neck lever sideways with the spring, as and for the purposes specified.

In testimony whereof we have signed our names to this specification.

LEONARD JOSEPH DOOGOOD.
LEO PATRICK BRANAGAN.